Figure 1:
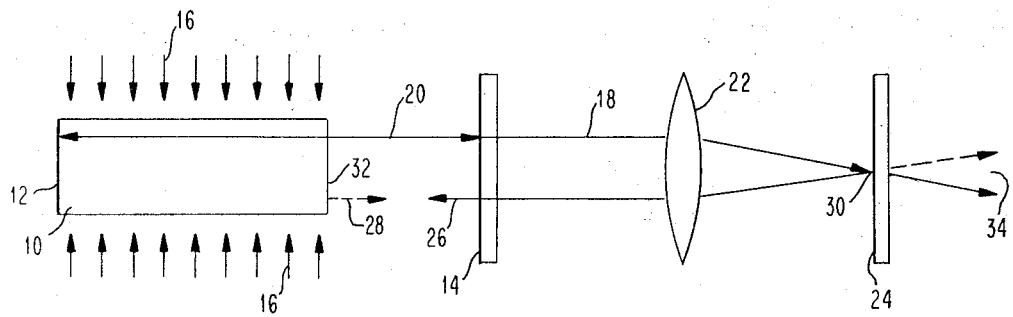

Jan. 30, 1968   J. W. CROWE   3,366,892

SOLID STATE LASER MODE SELECTION MEANS

Filed March 26, 1963

INVENTOR
JAMES W. CROWE

BY *Frederick D. Poos*
ATTORNEY

United States Patent Office 3,366,892
Patented Jan. 30, 1968

3,366,892
SOLID STATE LASER MODE SELECTION MEANS
James W. Crowe, Germantown, Md., assignor to International Business Machines Corporation, New York, N.Y., a corporation of New York
Filed Mar. 26, 1963, Ser. No. 268,063
1 Claim. (Cl. 331—94.5)

This invention relates to means for improvement in control of the frequency of light emitted by solid state lasers, and more particularly to improved resonator means for enabling selection of single frequency operation thereof.

Single mode patterns have been achieved in operation of gas lasers by use of resonant cavities formed by a pair of concave mirrors. These patterns indicate that the light participating in their production is monochromatic.

Efforts to produce monochromatic light from solid state lasers have been met with greater difficulty. For example, the light output from a ruby laser ordinarily undulates non-uniformly over the face of the crystal, the emission being highly irregular in intensity and consisting of a multitude of wavelengths which, at room temperature, is group in a 4 A. band centered at 6943 A.

However, many investigators have observed certain symmetrical patterns to occur non-reproducibly while taking high-speed pictures of the laser pattern produced by rubies, and a report by V. Evtuhov and V. K. Neeland, in Applied Optics, vol 1, page 517 (1962), states that reproducible wave guide modes were obtained by rotating the ruby crystal in an elliptical pumping cavity.

The present invention is directed to the provision of an improved means of selecting modes of laser operation in a device employing a solid state laser medium, whereby very highly monochromatic light output can be obtained from the device, reproducibly. A preferred approach employed is to select, from the frequencies reinforced by a Fabry-Perot (parallel-plate) resonator, a condition of resonance which also satisfies a demand for inversion-rotation symmerty. The sensitivity of the selection may be increased by limiting the field of the laser participating in the resonant cavity, and if desired, still further control can be achieved by utilization of the resonant property and symmetry points of a selected scattering center in, or associated with, the laser.

Accordingly, a major object of the invention is to provide an improved device employing a solid state laser medium to produce very highly monochromatic light.

Another object of the invention is to provide improved resonant cavity means for a laser providing inversion and rotation in a resonant path, for reinforcing mode patterns having inversion-rotation symmetry, in a compound arrangement which includes parallel plate resonant means of a related wavelength sensitivity.

Still another object of the invention is to provide an improved compound resonator means for a solid state laser as aforesaid, which enables limitation and selection of the field of the laser, as well as the effective angle of optical alignment of the resonator with respect to a selected scattering center affecting the laser operation.

The foregoing and other objects, features and advantages of the invention will be apparent from the following more particular description of preferred embodiments of the invention, as illustrated in the accompanying drawings.

Figure 2:
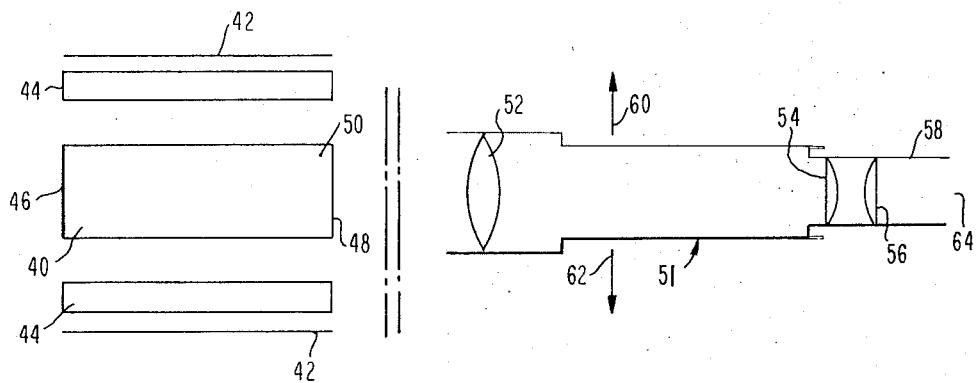

In the drawings:

FIG. 1 is a schematic diagram of one kind of optical arrangement for providing a laser with a resonator embodying parallel-plate reflector and inversion means, in accordance with the invention; and FIG. 2 is a diagrammatic showing of another optical system which provides direct and rotationally inverted reflections in the resonant cavity.

In the system of FIG. 1, an active medium 10, such as ruby, is provided with parallel plate (Fabry-Perot) resonator means comprising a totally silvered face 12 and a partially reflecting, plane mirror 14. Pumping energy such as radiation 16 is provided from a flash lamp and reflector array which may be of a usual kind, and is not included in the diagram of FIG. 1. (A suitable pumping means is shown in FIG. 2.) When the pumping energy exceeds the threshold of laser operation, stimulated emission of radiation is induced.

Preferably the mirror 14 is not more than about 40% reflecting to the laser light. Thus a substantial portion 18 of a light beam 20 originating in the ruby 10 is passed by the mirror 14. A converging lens 22 and a second mirror 24 form a means whereby a portion 26 of the light 18 is returned to the laser medium 10 in an orientation which is rotationally inverted with respect to the source beam 20. Other beams, such as indicated at 28 are acted upon in like manner, so that two beams 20, and 28, arising differently within the laser can react with each other or with the structure (imperfections, etc.) which gave rise to the light.

If the reflective surface of the mirror 24 is at the focal point 30 of the lens 22, beams 26 and 28 can become coincidental in the resonant cavity so as to reinforce each other. However, experiments have yielded desired mode patterns in the laser operation with the rotationally inverting mirror 24 set to yield a rotationally inverted image which appears, when viewed from a position approximating the operative placement of the unsilvered face 32 of the ruby, to be the same size as, and directly overlying the directly reflected image seen in the Fabry-Perot mirror 14. Accordingly, it appears that an exactly parallel relationship between the radiated and returning beams 20, 26 is not necessary to produce a useful result.

Output light 34 can be taken from the resonator by making the inverting mirror 24 only partially reflective, or, if desired, light could be taken from the other end of the system by making the mirror 12 partially transmissive.

FIG. 2 shows an arrangement providing greater flexibility and precision of adjustment. A cylindrical ruby crystal 40 is provided with a pumping cavity 42 which is coaxial therewith. The cavity 42 is of generally square cross-section with flash lamps provided in its four corner regions, two of which lamps are seen at 44, 44. One end 46 of the ruby is totally silvered and the other end 48 is uncoated. The crystal is, for example, a ⅜ by 4 inches, 0.04% $C^{3+}$ ruby rod, grown by the flame fusion or Verneuil technique, and having a minute (for example, 28 micron) scattering center 50 near the unsilvered end.

A microscope 51, positioned to receive light from the laser ruby 40, has a 30 mm. x 57 mm. objective lens 52 and eyepiece 54, 56 which are 15 mm. x 37 mm. and 11 mm. x 37 mm., respectively. The lenses are coated and have a surface reflectivity of 0.3 at 6943 A. Typically, the objective lens 52 may be about five inches from the unsilvered face 48 of the ruby and its adjustable eyepiece 58 is set for magnification of about six to ten power so as to restrict the field to less than the end face of the ruby. The microscope is also translatable laterally, as indicated at 60, 62 by a sliding carriage (not shown).

In one series of experiments, when the microscope was positioned directly over the scattering center, several different modes were obtainable. The modes were very stable and could be varied from one to another by moving the microscope transversely. The patterns appeared to have the form of various wave guide modes. It is postulated that the observed modes, having been generated by the scattering center, are selected by the optics of the miscroscope. If an object is held in front of the microscope and illuminated, one sees reflections from two surfaces in the microscope. One reflection appears as a direct reflection, and the other has undergone a rotary-reflection operation. Both images are the same size and about the same intensity. Only symmetrical modes are encouraged by this reflector, since modes that go into themselves under rotary-reflection have the highest reflectivity.

It may also be noticed that the eyepiece 58 is set far enough behind the objective lens 52 so that a plane wave emanating from the ruby 40 would not be entirely intercepted by the reflecting eyepiece. This has the effect of limiting the area of the face of the ruby receiving reflected light. When the active area is so restricted and positioned over a single scattering center, background "noise" is suppressed and modes form more clearly. Operation at near threshold pumping power also simplifies the response. Usually, if two or more scattering centers are included in the active field, no symmetrical modes are generated. A dust particle on the laser face and dust particles that float in the air between the laser and reflector have been seen to generate modes. That the modes are theoretically possible was shown by Mie in 1908. Plane light waves that are reflected from the back mirror strike the dielectric sphere. These waves set up standing waves in the sphere in phase with the incident light. The modes thus developed are not the normal modes of the sphere, since they must be in phase with the incident light. The sphere then radiates from its induced modes, and the light thus produced combines with the incident light to produce the far-field pattern.

The output of the device of FIG. 2 may be taken at 64, by means of a camera or otherwise. In the apparatus of FIG. 1, field restriction and selection can be effected by the optical system field and placement, generally similarly to the apparatus of FIG. 2.

If the active feedback path does not include a discernable scattering center, the threshold for laser operation increases greatly. However, single mode patterns do form in such instances and have the feature of simplicity of configuration. They may be described mathematically as low order modes. While the optical system, by the aforementioned lateral adjustment, has the useful ability to select particular modes from great variety of possibilities, by specific cooperation with symmetry points associated with the scattering center 50, a more fundamentally useful advantage is believed to lie in the reliable production of single wave guide mode patterns and correspondingly highly monochromatic light, by operation of the compound, parallel-plate and inverting, resonating means.

While the invention has been particularly shown and described with reference to preferred embodiments thereof, it will be understood by those skilled in the art that the foregoing and other changes in form and details may be made therein without departing from the spirit and scope of the invention.

What is claimed is:
1. In a solid state device for producing a selected mode of radiation generated by stimulated emission, the combination comprising:
   means for inducing stimulated emission of radiation, including a source of pumping energy and a solid state active medium adapted to emit radiation by stimulation when acted upon by pumping energy from said source;
   and resonant cavity means for effecting multiple amplification of a selected mode of said radiation, comprising
   first and second concurrent resonating means, embracing said medium,
   said first resonating means comprising a parallel plate resonator,
   and said second resonating means comprising one plate of said parallel plate resonator and a refracting lens and a plane reflector,
   said lens being positioned outside said parallel plate resonator and within said second resonating means and said plane reflector being positioned approximately at the focal point of said lens.

References Cited
UNITED STATES PATENTS

| 3,134,857 | 5/1964 | Kisliuk et al. | 331—94.5 |
| 3,187,270 | 6/1965 | Kogelnik et al. | 331—94.5 |
| 3,242,439 | 3/1966 | Rigden et al. | 31—94.5 |

OTHER REFERENCES
Kleinman et al.: Discrimination Again Unwanted Orders in the Fabry-Perot Resonator. Bell System Technical Journal (March 1962), pp. 453–462.

JEWELL H. PEDERSEN, *Primary Examiner.*

W. L. SIKES, *Assistant Examiner.*